United States Patent [19]
Ue et al.

[11] Patent Number: 5,162,421
[45] Date of Patent: Nov. 10, 1992

[54] RUBBER COMPOSITION

[75] Inventors: Hitoshi Ue; Yasuharu Yoshii; Shinji Misono, all of Gotenba, Japan

[73] Assignee: Tokai Carbon Co., Ltd., Tokyo, Japan

[21] Appl. No.: 685,250

[22] Filed: Apr. 15, 1991

Related U.S. Application Data

[63] Continuation of Ser. No. 538,065, Jun. 13, 1990, abandoned.

[30] Foreign Application Priority Data

Jul. 18, 1989 [JP] Japan ................................. 1-186332

[51] Int. Cl.$^5$ ................................. C08K 3/04
[52] U.S. Cl. ................................. 524/495; 524/496
[58] Field of Search ................................. 524/495, 496

[56] References Cited

FOREIGN PATENT DOCUMENTS 6210581 9/1982 Japan .

Primary Examiner—Paul R. Michl
Assistant Examiner—Edward Cain
Attorney, Agent, or Firm—Armstrong & Kubovcik

[57] ABSTRACT

A rubber composition comprising 100 parts by weight of a rubber component and compounded therewith 30 to 100 parts by weight of a carbon black of the category of hard carbon blacks having a nitrogen adsorption specific surface area (N$_2$SA) of 58 to 139 m$^2$/g, a DBP absorption number of 90 to 150 ml/100 g and having such selective characteristics that the intraaggregate void size, $D_p$ (nm), as measured by mercury porosimetry is equal to or higher than a value calculated by the relational formula $[-0.22 \times (N_2SA) + 60.8]$.

1 Claim, 1 Drawing Sheet

RUBBER COMPOSITION

This is a continuation of application Ser. No. 07/538,065 filed Jun. 13, 1990 now abandoned.

BACKGROUND OF THE INVENTION

The present invention relates to a rubber composition having a combination of a high resilience with a high abrasion resistance.

There are many kinds of carbon black for reinforcement of rubber according to fundamental characteristics such as average particle diameter, specific surface area and structure. The characteristics of carbon black are a major factor determining the properties of a rubber composition with which carbon black is compounded.

For this reason, in compounding carbon black with a rubber, carbon black having characteristics suitable for the applications of the rubber composition has been selected for use.

For example, when the rubber composition is required to have a high resilience, a carbon black having a large particle diameter and a relatively small surface area is believed to be useful. However, a carbon black of this kind has a drawback that it deteriorates the reinforcibility, particularly the abrasion resistance, of the rubber composition.

Therefore, when a rubber composition is desired to have both of elasticity and abrasion resistance as in a tire tread for low fuel consumption, tire side wall, industrial belt, etc., it is difficult to meet the performance requirements through selection of conventional carbon black mainly based on the fundamental characteristics thereof.

SUMMARY OF THE INVENTION

An object of the present invention is to provide a rubber composition having a combination of a high resilience with a high abrasion resistance.

The above-described object of the present invention can be attained by compounding 100 parts by weight of a rubber component with 30 to 100 parts by weight of a carbon black of the category of hard carbon blacks having a nitrogen adsorption specific surface area ($N_2SA$) of 58 to 139 $m^2/g$, a DBP absorption number of 90 to 150 ml/100 g and having such selective characteristics that the intraaggregate void size, $D_p$(nm), as measured by mercury porosimetry is equal to or higher than a value calculated by the relational formula $[-0.22 \times (N_2SA) + 60.8]$.

DESCRIPTION OF THE PREFERRED EMBODIMENTS

Among the characteristics of carbon black specified in the present invention, a nitrogen adsorption specific surface area ($N_2SA$) of 58 to 139 $m^2/g$ and a DBP absorption number of 90 to 150 ml/100 g are characteristics of a usual hard carbon black and necessary to impart a high abrasion resistance to a compounded rubber and, at the same time, to maintain a suitable ice skid performance.

When the nitrogen adsorption specific surface area ($N_2SA$) is less than 58 $m^2/g$, the abrasion resistance is remarkably lowered. On the other hand, when it exceeds 139 $m^2/g$, the dispersion of the carbon black in the rubber is deteriorated, which inhibits an improvement in the abrasion resistance. When the DBP absorption number is less than 90 ml/100 g, the abrasion resistance is spoiled, while when it exceeds 150 ml/100 g, the ice skid performance is lowered unfavorably.

An intraaggregate void size, $D_p$(nm), as measured by mercury porosimetry equal to or higher than a value calculated by the relational formula $[-0.22 \times (N_2SA) + 60.8]$ means that the carbon black has a highly developed unique aggregate structure. Such a carbon black is characterized in that the anisotropy of the aggregate structure is larger than that of the conventional carbon black having a $N_2SA$ value comparable to that of the above carbon black. When the above-described prerequisites and the requirement of the relational formula are satisfied, it is possible to attain an effective improvement in the resilience of the rubber composition without detriment to the abrasion resistance.

The various characteristics of the carbon black according to the present invention are measured by the following methods.

(1) Nitrogen adsorption specific surface area ($N_2SA$):

It is measured according to ASTM D3037-86 "Standard Test Method for Carbon Black-Surface Area by Nitrogen Adsorption", Method B.

(2) DBP absorption number:

It is measured according to JIS K 6221 (1982) "Testing Methods of Carbon Black for Rubber Industry", Item 6.1.2, Absorption Number Measurement Method A.

(3) Intraaggregate void size, $D_p$(nm):

A mercury porosimeter (Pore Sizer 9300) manufactured by Micrometritics is used for this purpose, and a cell for exclusive use (3 ml) is charged with 0.2 g of a carbon black pellet of which the particle size has been adjusted to 250 to 500 μm.

Mercury is introduced into the cell under a pressure of 25 to 30,000 lb/in$^2$ to determine a pressure at which the amount of mercury introduced under pressure is rapidly increased. The pore diameter is calculated from the pressure and regarded as the void diameter of the particle aggregates.

The intraaggregate void size of IRB No. 5 ($N_2SA$: 80.3 $m^2/g$) was measured by the above-described method and found to be 40 nm.

Figure 1:
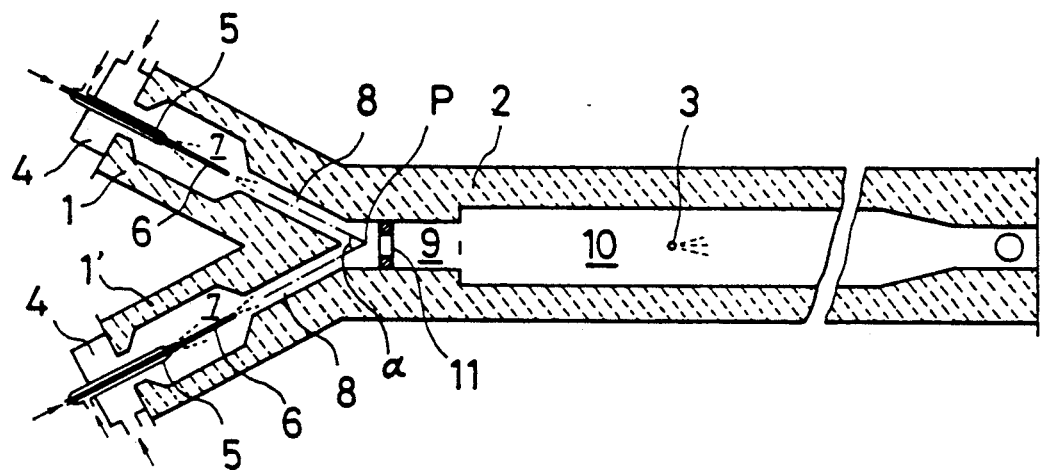
FIG. 1 of the accompanying drawings shows a longitudinal sectional view of a furnace for producing the furnace carbon black of this invention.

The carbon black having the above-mentioned characteristic properties is produced by a Y-shaped oil-furnace process using a reactor as shown in the accompanying FIG. 1 (see Japanese Patent Publication No. 32-10582), in which reference numerals 1 and 1' each denote a generator comprising a wind box 4, a burner 5, a feedstock oil spray nozzle 6, a combustion chamber 7, and a pyrolysis duct 8. The generators are arranged in such a manner that the pyrolysis ducts converge at point P in the cylindrical main reaction zone 2. The hydrocarbon feedstock oil is sprayed into the combustion gas of fuel oil so that the oil spray is pyrolyzed. The burned gas streams from the generators enter the zone 2 at a high speed and impinge against each other.

In operation, adequate adjustments are made for the supply of feedstock oil and other conditions for pyrolysis in the generators and for the position of water spray 3 in the main reaction zone 2 which determines the residence time for the burned gas to reach the water spray, whereby it is possible to produce the carbon black that has all the characteristic properties specified in this invention.

The prepared carbon black is compounded according to a customary method with natural rubbers, various synthetic rubbers capable of being reinforced with a commonly used carbon black, such as styrene-butadiene rubber, polybutadiene rubber, isoprene rubber and butyl rubber, and elastomers such as mixed rubbers. The rubber composition of the present invention can be prepared by compounding 100 parts by weight of a rubber component with 30 to 100 parts by weight of a carbon black having the above-described characteristics. Necessary components, such as vulcanizing agents, vulcanization accelerators, antioxidants, vulcanization assistants, softening agents and plasticizers, may properly be compounded with the rubber composition of the present invention.

As described above, the carbon black in the present invention has a $N_2SA$ and a DBP absorption number respectively falling within specific ranges. These characteristics are necessary to impart a high abrasion resistance to a rubber composition. Further, the carbon black in the present invention meets such a characteristics requirement that the intraaggregate void size, $D_p$(nm), as measured by mercury porosimetry is equal to or higher than a value determined by the formula $[-0.22 \times (N_2SA) + 60.8]$.

In general, a carbon black having a large intraaggregate void size $D_p$ essentially has a developed aggregate structure and improves the reinforcibility of rubber when compounded therewith.

In particular, when the intraaggregate void size, $D_p$, as measured by mercury porosimetry is equal to or higher than a value calculated by the above-described relational formula, the resilience of the rubber composition can be improved while maintaining the abrasion resistance on a high level through an ingenious action of the highly developed anisotropic structure of the aggregate.

Thus, the rubber composition of the present invention has a combination of an excellent resilience with an excellent abrasion resistance and therefore is suitable for use in applications where both of the above characteristics are required, such as treads and side walls of automobile tires, industrial belts and hoses.

The present invention will now be described in more detail by way of the following Examples in comparison with Comparative Examples.

EXAMPLE 1

As shown in the drawing, there was provided an oil furnace having a Y-shaped structure comprising a main reaction zone 2 composed of two connectively provided portions i.e., a large-diameter rear portion 10 having an inner diameter of 200 mm and a length of 900 mm and a small-diameter front portion 9 having an inner diameter of 90 mm and a length of 900 mm; and, convergently linked to the front thereof at a crossing angle ($\alpha$) of 60°, two generators, i.e., a first generator 1 and a second generator 1' each equipped with a combustion chamber 7 having an inner diameter of 400 mm and a length of 800 mm (including a conical portion having a length of 200 mm) provided with a burner 5 and a feedstock oil spray nozzle 6 through a wind box 4 and a pyrolysis duct 8 having an inner diameter of 60 mm and a length of 600 mm.

Figure 2:
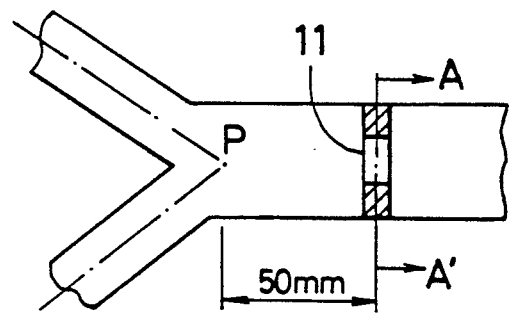
FIGS. 2 and 3 are views respectively showing in enlargement an essential part of the furnace illustrated in FIG. 1.
Figure 3:
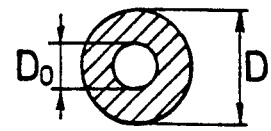

The small-diameter portion 9 was provided with a ring member 11 shown in FIGS. 2 and 3 having a constriction ratio of 0.60 at a position 50 mm downstream from an intersection P. The constriction ratio is represented by the following equation:

$$m = \frac{\pi/4 \, D_0^2}{\pi/4 \, D^2} = \left(\frac{D_0}{D}\right)^2 = 0.60$$

wherein
D=90 and
$D_0$=69.7.

An aromatic hydrocarbon oil having a specific gravity of 1.0703 (15/4° C.), a viscosity of 2.10 (Engler: 40/20° C.), a benzene insoluble content of 0.03%, a coefficient of correlation (BMCI) of 140, and an initial boiling point of 103° C. was used as a stock oil, and a hydrocarbon oil having a specific gravity of 0.903 (15.4° C.), a viscosity (cSt: 50° C.) of 16.1, a residual carbon content of 5.4%, a sulfur content of 1.8%, and a flash point of 96° C. was used as a fuel oil.

Carbon blacks (five types) having characteristics specified in the present invention were prepared by making use of the above-described reaction furnace, stock oil, and fuel oil under generation conditions specified in Table 1.

Various characteristics of the carbon black thus prepared are given in Table 2.

In Table 2, carbon blacks of Comparative Examples 1 to 4 are each a hard one having a nitrogen adsorption specific surface area ($N_2SA$) and a DBP absorption number falling within the scope of the present invention but has such an aggregate property that the intraaggregate void size $D_p$ as measured by mercury porosimetry is lower than that specified in the present invention.

TABLE 1

| Ex. No. | Generator series | Total air feed (Nm³/hr) | Fuel oil feed (kg/hr) | Fuel combustion rate (%) | Feedstock oil feed (kg/hr) | Residence time within furnace (msec) |
|---|---|---|---|---|---|---|
| 1 | 1 | 210 | 10.8 | 180 | 102.7 | 8.8 |
|   | 2 | 260 | 13.3 | 180 | 103.8 |   |
| 2 | 1 | 210 | 10.8 | 180 | 102.7 | 8.5 |
|   | 2 | 260 | 13.3 | 180 | 97.5 |   |
| 3 | 1 | 240 | 13.0 | 170 | 105.9 | 8.2 |
|   | 2 | 260 | 14.1 | 170 | 90.8 |   |
| 4 | 1 | 220 | 12.0 | 170 | 67.2 | 8.0 |
|   | 2 | 280 | 15.2 | 170 | 79.7 |   |
| 5 | 1 | 220 | 12.0 | 170 | 54.7 | 7.5 |
|   | 2 | 290 | 15.8 | 170 | 62.7 |   |

TABLE 2

| Characteristics | Ex. No. 1 | 2 | 3 | 4 | 5 | Comp. Ex. No. 1 | 2 | 3 | 4 |
|---|---|---|---|---|---|---|---|---|---|
| nitrogen adsorption specific surface area (m²/g) | 59 | 62 | 74 | 93 | 122 | 76 | 93 | 117 | 138 |
| DBP absorption | 99 | 110 | 114 | 116 | 129 | 102 | 112 | 116 | 115 |

TABLE 2-continued

| Characteristics | Ex. No. | | | | | Comp. Ex. No. | | | |
| --- | --- | --- | --- | --- | --- | --- | --- | --- | --- |
| | 1 | 2 | 3 | 4 | 5 | 1 | 2 | 3 | 4 |
| number (ml/100 g) intra-aggregate void size $D_p$ (nm) | 52.0 | 52.3 | 50.6 | 45.6 | 40.1 | 40.2 | 37.9 | 32.7 | 25.0 |
| value determined by the formula | 47.8 | 47.2 | 44.5 | 40.3 | 34.0 | 44.1 | 40.3 | 35.1 | 30.4 |

Then, the carbon blacks listed in Table 2 were each compounded with synthetic rubber components (oil extended SBR) in a compounding ratio specified in Table 3.

TABLE 3

| Compounding components | Parts by weight |
| --- | --- |
| styrene-butadiene rubber (SBR)[1] | 137.5 |
| carbon black | 68.75 |
| stearic acid (dispersion vulcanization assistant) | 1.0 |
| zinc oxide (vulcanization assistant) | 3.0 |
| sulfur (vulcanizing agent) | 1.75 |
| N-t-butyl-2-benzothiazylsulfeneamide (vulcanization accelerator) | 1.38 |

Note: [1]JSR 1712 (manufactured by Japan Synthetic Rubber Co., Ltd.)

The compounds listed in Table 3 were vulcanized at 145° C. for 50 min to prepare rubber compositions. Each composition was subjected to tests on loss tangent and abrasion. The results are given in Table 4.

The test methods and conditions were as follows.

(1) Loss tangent (tan δ):
measured with a Visco Elastic Spectrometer (manufactured by Iwamoto Seisakusho K.K.) under the following conditions.
  Test piece: 2 mm in thickness, 30 mm in length, 5 mm in width.
  Temperature: room temperature
  Frequency: 50 Hz
  Dynamic strain: ±1%

(2) Lambourn abrasion resistance:
measured with a Lambourn abrasion tester (of mechanical slip type) under the following conditions.
  Test piece: 10 mm in thickness, 44 mm in diameter.
  Emery wheel:
    GC type; grain size: 80;
    hardness: H
  Carborundum added:
    grain size: 80; rate of addition: approximately 9 g/min
  Speed of revolution of test piece: 660 rpm
  Load of test piece: 4 kg
  Relative slipping: 24%, 60%

As is apparent from the comparison of the characteristics of the carbon black given in Table 2 with the performance of the rubber given in Table 4, when carbon blacks each having a comparable specific surface area level are used, the rubber compositions satisfying the requirements of the present invention have a reduced loss tangent while enjoying a comparable abrasion resistance as compared with those of the Comparative Examples wherein the intraaggregate void size is lower than the value determined by the relational formula. This substantiates that the resilience has been sufficiently improved by the present invention.

TABLE 4

| Ex. No. | Loss tangent (tan δ) | Lambourn abrasion (cc) | |
| --- | --- | --- | --- |
| | | LA 24% | LA 60% |
| Ex. 1 | 0.313 | 0.1056 | 0.1300 |
| Ex. 2 | 0.309 | 0.1042 | 0.1106 |
| Ex. 3 | 0.326 | 0.0929 | 0.1045 |
| Ex. 4 | 0.343 | 0.0819 | 0.1022 |
| Ex. 5 | 0.350 | 0.0761 | 0.0957 |
| Comp. Ex. 1 | 0.350 | 0.0978 | 0.1334 |
| Comp. Ex. 2 | 0.370 | 0.0824 | 0.1160 |
| Comp. Ex. 3 | 0.379 | 0.0795 | 0.1121 |
| Comp. Ex. 4 | 0.401 | 0.0746 | 0.1056 |

What is claimed is:

1. A rubber composition comprising 100 parts by weight of a rubber component and, compounded therewith, 30 to 100 parts by weight of a hard carbon black having a nitrogen adsorption specific surface area ($N_2SA$) of 58 to 139 m²/g, a DBP absorption number of 90 to 150 ml/100 g and having an intraaggregate void size, $D_p$ (nm), as measured by mercury porosimetry, equal to or higher than a value calculated by the formula $-0.22 \times (N_2SA) + 60.8$.

* * * * *